United States Patent
Kolb et al.

(10) Patent No.: US 6,228,531 B1
(45) Date of Patent: *May 8, 2001

(54) ELECTRODE MODIFICATION USING SURFACE ASSOCIATED LITHIUM SALTS AND AN ASSOCIATED PROCESS FOR FABRICATION OF AN ELECTRODE

(75) Inventors: Eric S. Kolb, Acton; Martin Van Buren, Chelmsford; Denis G. Fauteux, Acton, all of MA (US)

(73) Assignee: Mitsubishi Chemical Corporation (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,013

(22) Filed: Oct. 2, 1998

Related U.S. Application Data

(60) Provisional application No. 60/061,968, filed on Oct. 14, 1997, and provisional application No. 60/064,751, filed on Oct. 22, 1997.

(51) Int. Cl.[7] .............. H01M 4/48; H01M 4/52; H01M 4/60; H01M 4/04
(52) U.S. Cl. .......... 429/212; 429/231.1; 429/231.3; 29/623.5
(58) Field of Search ............. 429/212, 213, 429/214, 215, 216, 231.1, 231.3; 29/623.1, 623.5

(56) References Cited

U.S. PATENT DOCUMENTS

| | | | |
|---|---|---|---|
| 4,579,792 | * 4/1986 | Bruder | 429/162 |
| 5,705,291 | 1/1998 | Amatucci et al. | 429/137 |
| 5,965,293 | * 10/1999 | Idota et al. | 429/218.1 |

FOREIGN PATENT DOCUMENTS

| | | |
|---|---|---|
| 55-157861 | * 12/1980 | (JP). |
| 55-163779 | * 12/1980 | (JP). |
| 56-30263 | * 3/1981 | (JP). |
| 56-30264 | * 3/1981 | (JP). |
| 57-128460 | * 8/1992 | (JP). |
| 8-111233 | * 4/1996 | (JP). |
| 9-92280 | * 4/1997 | (JP). |
| 09171813 | 6/1997 | (JP). |
| WO 96/38872 | 12/1996 | (WO). |

OTHER PUBLICATIONS

Hawley's Condensed Chemical Dictionary, 13th ed., p. 154, entry for "bond, chemical", 1997.*

Article entitled Phase Stability of $LiAlO_2$ in Molten Carbonate, published Dec. 12, 1997, J. Electrochem, Soc., vol. 144, No. 12.

* cited by examiner

Primary Examiner—Stephen Kalafut
Assistant Examiner—Jonathan Crepeau
(74) Attorney, Agent, or Firm—Factor & Partners

(57) ABSTRACT

The present invention is directed to an electrode, and associated fabrication process, for use in an electrochemical cell. The electrode has an active material comprising a transition metal oxide. A lithium salt having an organic component is associated with the surface of the transition metal oxide so as to increase compatibility with an associated electrolyte. In another embodiment, a lithium salt of saccharin may be adsorbed onto the surface of the transition metal oxide.

16 Claims, 5 Drawing Sheets

ELECTRODE MODIFICATION USING SURFACE ASSOCIATED LITHIUM SALTS AND AN ASSOCIATED PROCESS FOR FABRICATION OF AN ELECTRODE

This application depends from Provisional Patent Application Ser. No. 60/061,968 entitled CATHODE MODIFICATION USING SURFACE BONDED Li+SALTS, filed Oct. 14, 1997; and from Provisional Patent Application Ser. No. 60/064,751 entitled ELECTRODE MODIFICATION USING SURFACE BONDED ORGANOMETALLIC SALTS AND ASSOCIATED PROCESS FOR ELECTROLYTIC CELLS, filed Oct. 22, 1997.

BACKGROUND OF THE INVENTION

1. Field of the Invention

The present invention relates in general to electrodes for use in rechargeable lithium ion batteries, wherein the electrode includes an active material comprising a transition metal oxide having a surface associated with a lithium salt. The lithium salt increases compatibility of the active material with an associated electrolyte to, in turn, increase electrochemical performance of the electrode and associated electrochemical cell. The invention is also directed to a process for fabricating such a modified electrode for use in an electrochemical cell.

2. Background Art

The use of a transition metal oxide as an electrode (such as a cathode) active material between a current collecting substrate and an electrolyte in an electrochemical cell has been know in the art for several years. While such a coating improves electrical conductivity between the current collector and electrolyte, problems nevertheless have been observed with such a coating. Specifically, it is known that transition metal oxides are somewhat unstable with respect to the electrolyte (liquid, gel, plastic or polymer) during cell cycling. Accordingly, such instability results in rate and capacity loss during subsequent cycling and storage.

In an effort to combat such instability, the prior art has identified that inorganic salts, such as inorganic lithium salts, when coated on the surface of a transition metal oxide active material, will serve to stabilize the transition metal oxide relative to the associated electrolyte. Indeed, as identified in an article entitled *Phase Stability of $LiAlO_2$ in Molten Carbonate*, published Dec. 12, 1997, J. Electrochem. Soc., Vol. 144, No. 12, $LiAlO_2$ is a stable component in an associated electrolyte.

Furthermore, Japanese Kokai No. JP 09171813 (Benno, et al.) and Amatucci, U.S. Pat. No. 5,705,291, both disclose that an inorganic lithium salt can be associated with the surface of a transition metal oxide active material so as to result in a stable interface with the associated electrolyte. While stability has been addressed, none of such prior art teaches or suggests the use of an organic component associated with the lithium salt for increasing compatibility of the surface of the active material by the associated electrolyte. Such increased compatibility results in greater direct association between the surface of the active material and electrolyte which, in turn, facilitates increased ionic and electronic charge transfer therebetween.

SUMMARY OF THE INVENTION

The present invention is directed to an electrode for use in an electrochemical cell. The electrode comprises a current collector, an active material associated with the current collector, wherein the active material comprises a transition metal oxide having a surface, and means for increasing compatibility of the surface of the active material with respect to an associated electrolyte.

In a preferred embodiment, the compatibility increasing means comprises an inorganic lithium salt and organic R group associated with the inorganic lithium salt. The R group may be an aliphatic or aromatic cyclic or acyclic hydrocarbon which may comprise an aromatic ether, thioether, ester or the like (or other heteroatoms which are stable to reduction and/or oxidation and promotes electrolyte/interface interactions). The R group can attach or bond to the surface modifying inorganic lithium salt via a functional group XH where X=O, S, N(R') (R'=H, Me Ethyl, propyl . . . ), although the O may be preferred from an oxidative stability standpoint.

In such an embodiment, the compatibility increasing means is chemically bonded to the surface of the transition metal oxide.

In another preferred embodiment, the compatibility increasing means comprises an organic lithium salt. Such an organic lithium salt is adsorbed onto the surface of the transition metal oxide.

The present invention also contemplates that the electrode comprises. a cathode for use in a rechargeable lithium ion battery.

The present invention is also directed to a process for fabricating an electrode for use in an electrochemical cell. The process comprises the steps of a) applying an active material onto a current collector, wherein the active material comprises a transition metal oxide having a surface, and wherein the surface is partially compatible by an associated electrolyte; and b) increasing the compatibility of the surface of the transition metal oxide, by an associated electrolyte, by associating a lithium salt with the surface of the transition metal oxide.

In a preferred embodiment of the process, the step of associating a lithium salt with the surface of the transition metal oxide comprises the steps of c) chemically bonding an inorganic lithium salt with the surface of the transition metal oxide; and d) associating an organic R group with the inorganic lithium salt.

In yet another preferred embodiment of the process, the step of associating a lithium salt with the surface of the transition metal oxide comprises the step of adsorbing the lithium salt onto the surface of the transition metal oxide. In such an embodiment, the step of adsorbing comprises the steps of: 1) mixing the organic lithium salt with a solvent; 2) associating the mixture with the surface of the transition metal oxide; and 3) evaporating the solvent.

The preferred process also contemplates associating the fabricated electrode with an electrolyte and another electrode so as to form an electrochemical cell, such as a rechargeable lithium ion battery.

BEST MODE FOR PRACTICING THE INVENTION

Figure 2:
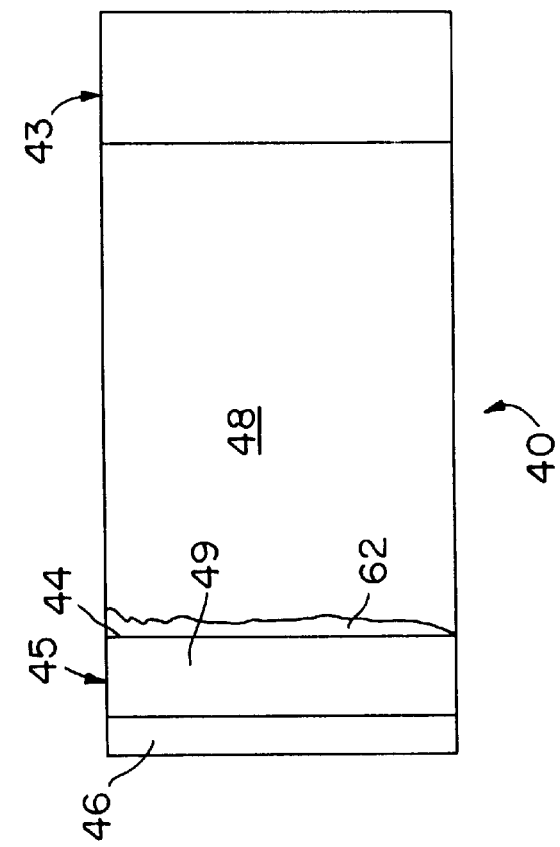
FIG. 2 is a schematic representation of one preferred embodiment of the present invention.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments so illustrated.

Figure 1:
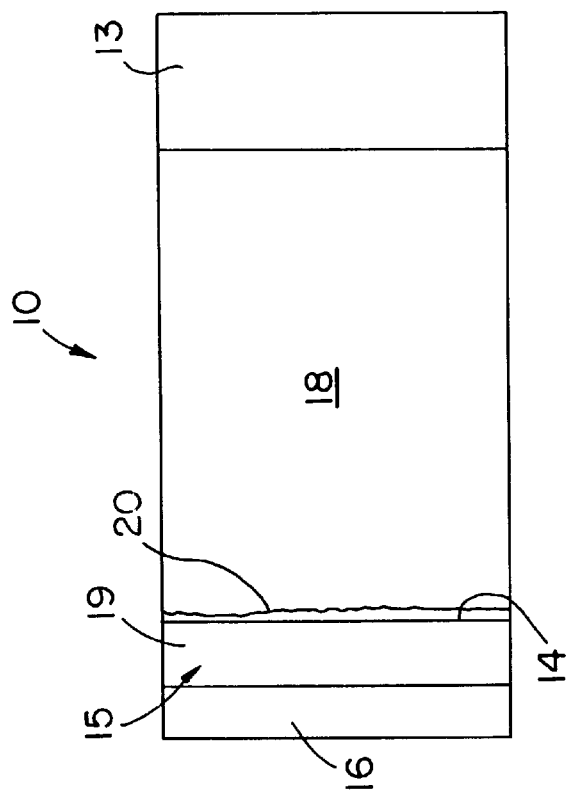
FIG. 1 is a schematic representation of a prior art electrochemical cell.

Prior art electrochemical cell 10 is shown in FIG. 1 as comprising anode 13, cathode 15 and electrolyte 18. Cathode 15 consists of current collector 16 and active material 19. The active material includes a transition metal oxide having a surface 14. As can be seen, native oxide layer 20 is associated with surface 14. Unfortunately, this native oxide layer impedes the electronic and ionic charge transfer during cell cycling and limits the compatibility of the electrolyte on surface 14 of active material 19. Accordingly, when compatibility is limited, there is less direct association between the active material and the electrolyte, and, in turn, less ionic and electronic charge transfer therebetween.

Electrochemical cell 40 of the present invention (which preferably comprises a rechargeable lithium ion battery) is shown in FIG. 2 as comprising cathode 45, anode 43 and electrolyte 48.

Cathode 45 consists of current collector 46 and active material 49. The active material includes a transition metal oxide having a surface 44. As shown in reaction form in FIG. 3, the surface of the transition metal oxide is chemically bonded with an inorganic lithium salt, such as $LiMH_4$. The inorganic salt is then associated with an organic R group to, in turn, result in an organometallic (lithium) salt interface with electrolyte 48. Such an interface serves to improve the compatibility of the interfacial properties of the electrode by an associated electrolyte, as compared to the electrode which does not associate such a lithium salt (with an organic component) with the surface of the transition metal oxide active material. It is contemplated that such a surface modification will result in improvements in electronic and ionic charge transfer, as well as with respect to maintaining the mechanical integrity of the electrode/electrolyte interface and improving the rate capacity and stability of the electrochemical cell. It is likewise contemplated that such enhanced interfacial properties may also improve the processing characteristics of the transition metal oxide layer by changing its surface energy, as well as improving surface uniformity of the active material.

Figure 3:
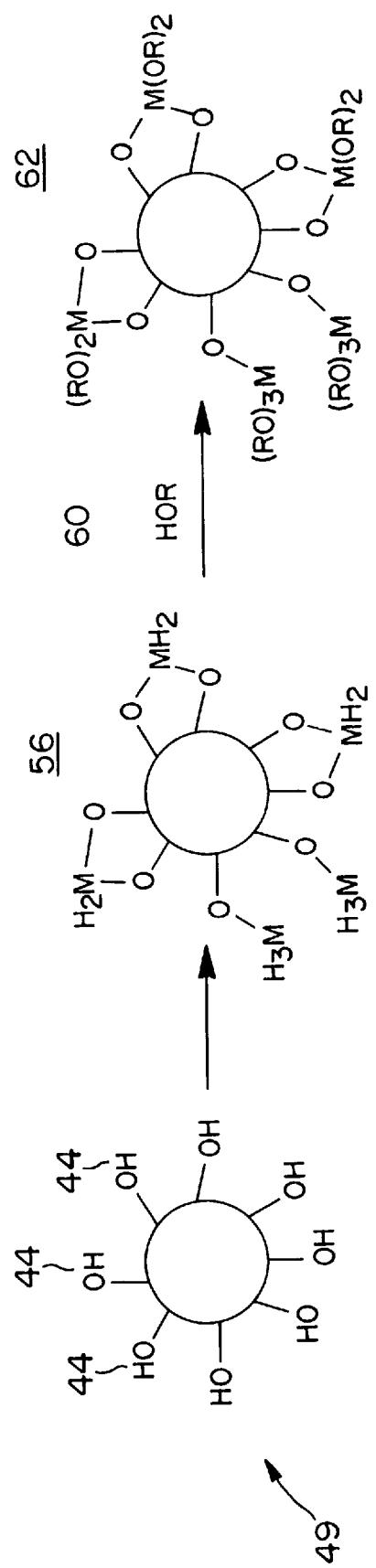
FIG. 3 shows a chemical reaction of the electrochemical process of the present invention.

The process for fabricating electrode 45, as shown in reaction form in FIG. 3, is accomplished by first treating the active material with an ether or THF solution of the LiMH4. After complete reaction, the XS hydride groups were converted by addition of RXH. The treated active material was separated from the solvent, washed and dried under vacuum. The treated active material was then coated on a current collector for evaluation.

As shown in FIG. 3, such a reaction forms a chemical bond between the lithium salt 50 and the surface 44 of transition metal oxide 49—thereby resulting in a mixed metal oxide which immobilizes the salt onto the surface of the transition metal oxide. The resulting product is a mixed metal oxide-metal hydride surface layer 56. A further reaction of surface 56 with an organic R group 60 then converts the surface to a mixed metal oxide-organometallic salt 62. The R group comprises a solvent/electrolyte compatible portion and a functional group for reaction with the LiMH4 treated surface 56. The solvent or electrolyte compatible portion of the R group includes, but is not limited to, an aliphatic or aromatic, cyclic or acyclic hydrocarbon which could comprise ether, amine, thioether, or other heteroatoms which are stable to the associated oxidation or reduction processes at the electrode interface. The R group may comprise a reactive group XH, which is ether, X=O, S, N(R') which is used to form the LiM—XR bond.

After reacting the residual metal hydride with the desired organic R group, the mixed metal oxide-organometallic salt surface 62 may then be purified by washing the surface with an appropriate solvent. This washing step removes the unbound lithium metal hydride salt and excess organic R group species.

Some acceptable materials for the above-identified process include a transition metal oxide consisting of $LiCoO_2$, a lithium metal hydride salt, wherein the metal can comprise B, Al, Sn, In, Ga or Ti, and a quench alcohol (organic R group) comprising $HO(CH_2CH_2O)_3$—$OMe$, or $HO(CH_2CH_2O)$—$CH_3$, $HO$—$(CH_2)n$—-$CH_3$, where n=1–12 or higher. Indeed a transition metal oxide with a mixed metal oxide-organometallic surface was prepared by using such materials and running the reaction in tetrahydrofuran, while using an excess of the $LiAlH_4$ and alcohol to drive the reaction to completion.

In another preferred embodiment, the associated lithium salt comprises an organic lithium salt which is adsorbed onto the surface of the transition metal oxide. As was identified above, the transition metal oxide used was $LiCoO_2$, however, the organic lithium salt was a lithium salt of saccharin.

Figure 4:
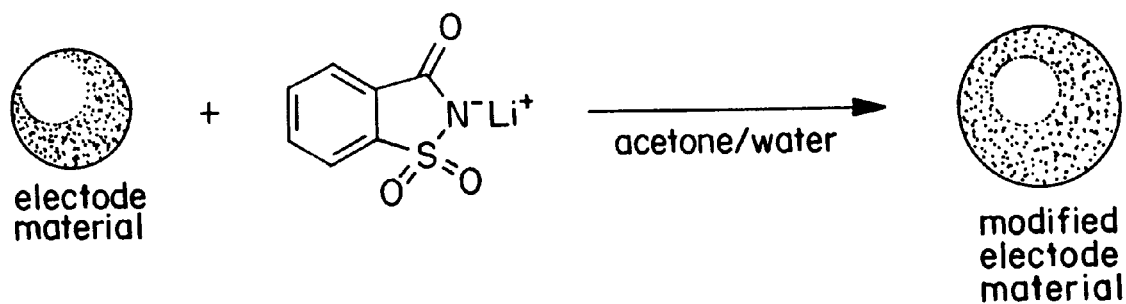
FIG. 4 is a schematic representation of another preferred embodiment of the present invention.

The process for fabricating an electrode/cathode which adsorbs an organic lithium salt to the surface of the transition metal oxide active material is shown in reaction form in FIG. 4. To obtain such a reaction, a lithium salt of saccharin (i.e. the solute), 5% wt, was charged into a single neck reaction vessel. Next, a mixture of water and acetone (i.e. the solvent), 95% wt, was charged into the reaction vessel and agitation was initiated to dissolve the solute within the solvent until dissolved. The mixture, containing the dissolved solute, was then associated with the surface of the transition metal oxide, in the reaction vessel. Finally, the solvent was evaporated under ambient temperature and pressure until dry, which resulted in the solute being adsorbed to the surface of the transition metal oxide. The synthesized material was then quantitatively characterized for rate capacity, as discussed below.

While a lithium salt of saccharin has been described for illustrative purposes, it will be readily understood to those having ordinary skill in the art that other organic lithium salts are likewise contemplated—as long as the particular salt does not readily dissolve in the associated electrolyte of an associated electrochemical cell. Additionally, although $LiCoO_2$ has been disclosed as the transition metal oxide, other transition metal oxides are likewise contemplated for use. Furthermore, any one of a number of solvents may be used in accordance with the present invention—the limitation being that the solute must readily dissolve in the particular solvent and be inert with respect to the transition metal oxide. Moreover, several other solvent removal techniques are also suitable for use, including, but by no means limited to, reduced pressure and/or elevated temperature environments.

In support of the present invention, rate capacity data of the surface modified electrode material was obtained by fabricating a three electrode test cell using the following procedure.

First, the surface modified electrode active material was mixed into a paste by addition of a binder (PVDF) and carbon black. Second, the electrode paste was pressed onto an aluminum mesh. Third, the three electrode cell was constructed, wherein the electrode with the pressed surface modified electrode active material served as the working electrode. The counter electrode and reference electrode were both constructed from lithium. The electrolyte used in each of the cells, and, in turn, in each of the experiments, comprised a one molar solution of $LiAsF_6$ dissolved in propylene carbonate containing 3% by weight of 1,6-dioaspiro[4.4]noname-2-7 dione (an electrolyte additive). The rate capacities of the fully constructed cell was then determined by cycling the cell between 3.2 and 4.2 volts.

Figure 5:
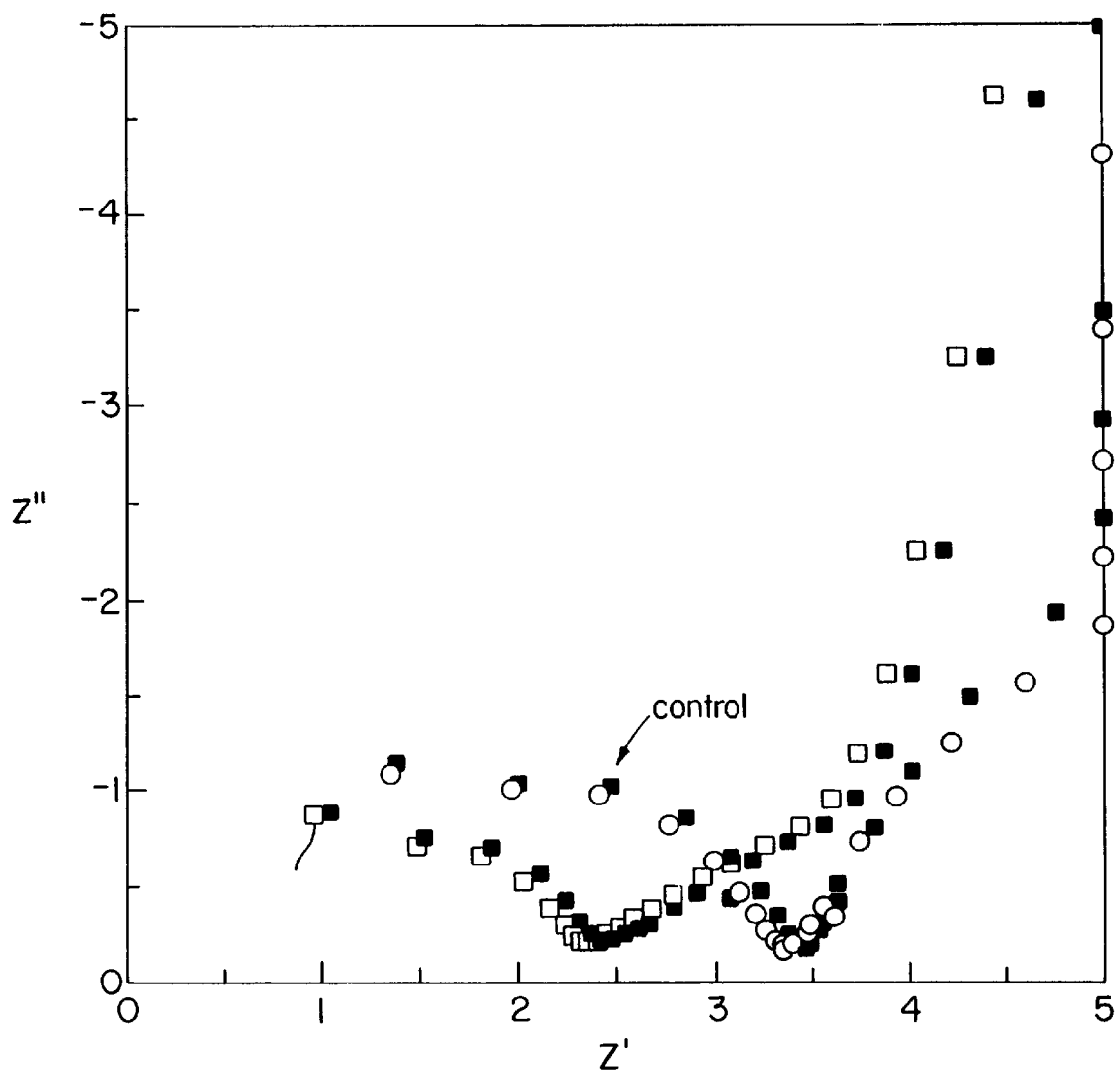
FIG. 5 is a graphical representation of the internal resistance of fully constructed cells comparing modified and unmodified surfaces.

As shown in FIG. 5, the internal resistance of fully constructed cells, as measured with AC impedance spectroscopy, is significantly lower for the cell using the surface modified $LiCoO_2$ when compared to the resistance of the cells using the unmodified $LiCoO_2$.

Figure 6:
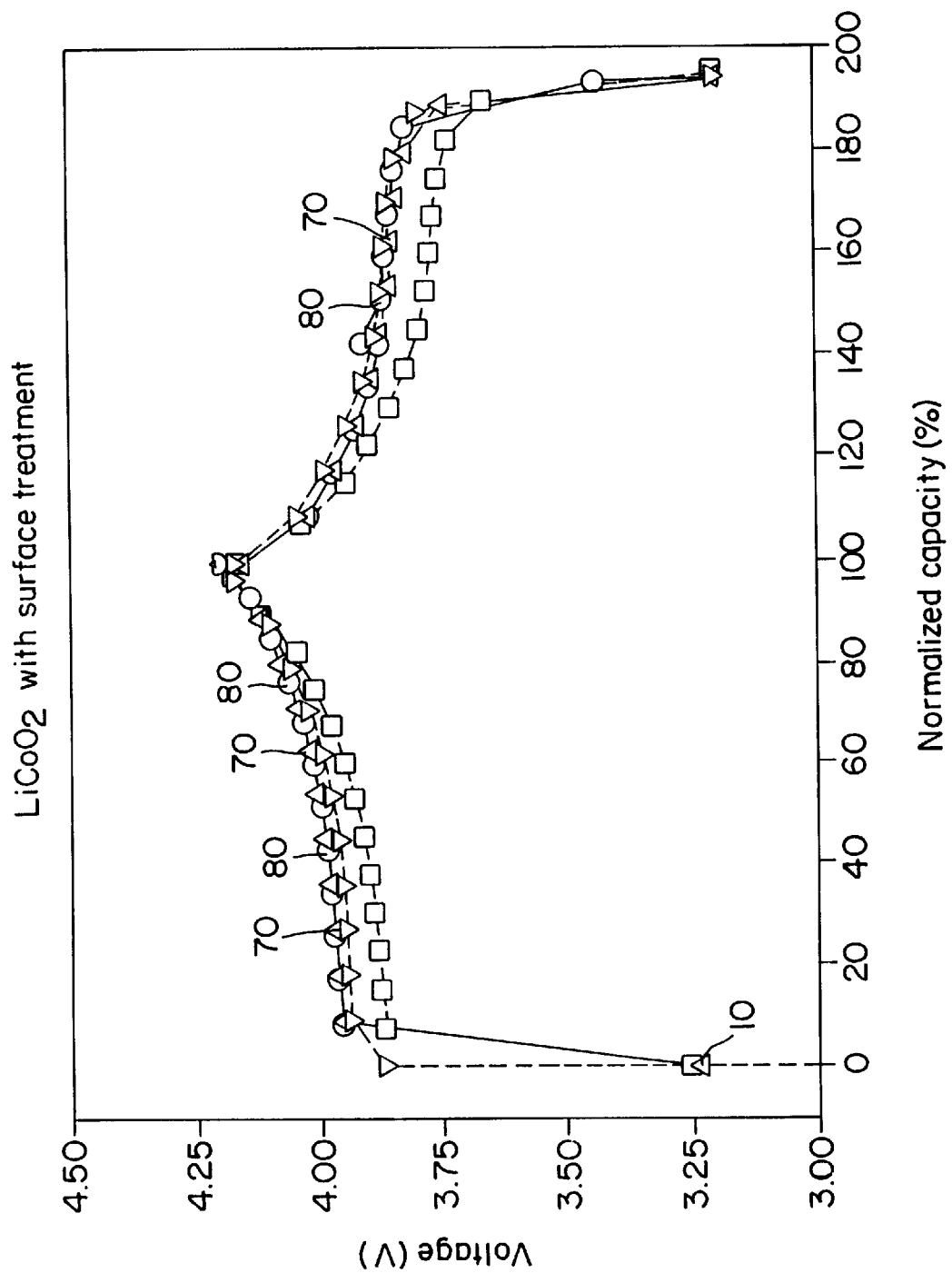
FIG. 6 is a graphical representation of rate capacities as associated with the present invention.

As shown in FIG. 6, triangles 70 (representing the surface modified $LiCoO_2$) exhibited very similar rate capacities to those of circles 80 (representing the unmodified reference electrode active material). The nearly perfect overlay of the two plots, appears to verify that in accordance with the present invention, an organometallic salt may be absorbed onto the surface of the electrode active material without altering its electrochemical rate capacities. To be sure, however, inasmuch as the organometallic salts have a greater affinity for the electrolyte, an increase in interfacial adhesion is observed which results in an improvement in the surface dependent electrochemical properties, which may include surface uniformity, as well as cell stability. Improved processing characteristics are likely to be observed as well.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. An electrode for use in an electrochemical cell, comprising:
    a current collector;
    an active material associated with the current collector, wherein the active material comprises a transition metal oxide having a surface; and
    means for increasing compatibility of the surface of the active material with respect to an associated electrolyte, wherein the compatibility increasing means comprises an inorganic lithium salt and organic R group associated with the inorganic lithium salt, whereby a chemical bond represented by —O—M(OR)n is formed on said surface of the active material, wherein M is a metal atom, and wherein n is an integer ranging from 2 to 3.

2. The electrode according to claim 1, wherein the R group is selected from the group consisting of aliphatic or aromatic cyclic or acyclic hydrocarbons comprising an aliphatic or aromatic ether, thioether, ester or other heteroatom which is stable to reduction and/or oxidation and which promotes electrolyte/interface interactions.

3. The electrode according to claim 1, wherein the chemical bond represented by —O—M(OR)n formed on said surface of the active material is formed by treating the transitional metal oxide with a lithium metal hydride salt and reacting the treated transitional metal oxide with organic R group species.

4. An electrode for use in an electrochemical cell, comprising:
    a current collector;
    an active material associated with the current collector, wherein the active material comprises a transition metal oxide having a surface; and
    means for increasing compatibility of the surface of the active material with respect to an associated electrolyte, wherein the compatibility increasing means comprises a lithium salt of saccharin.

5. The electrode according to claim 4, wherein the lithium salt of saccharin is adsorbed onto the surface of the transition metal oxide.

6. An electrochemical cell, comprising:
    a first electrode, a second electrode and an electrolyte, wherein at least one of the first and second electrodes includes:
    a current collector;
    an active material associated with the current collector, wherein the active material comprises a transition metal oxide having a surface; and
    means for increasing compatibility of the surface of the active material with respect to an associated electrolyte, wherein the compatibility increasing means comprises an inorganic lithium salt and organic R group associated with the inorganic lithium salt, whereby a chemical bond represented by —O—M(OR)n is formed on said surface of the active material wherein, M is a metal atom, and wherein n is an integer ranging from 2 to 3.

7. The electrochemical cell according to claim 6, wherein the R group is selected from the group consisting of aliphatic or aromatic cyclic or acyclic hydrocarbons comprising an aliphatic or aromatic ether, thioether, ester or other heteroatom which is stable to reduction and/or oxidation and which promotes electrolyte/interface interactions.

8. The electrochemical cell according to claim 6, wherein the chemical bond represented by —O—M(OR)n formed on said surface of the active material is formed by treating the transitional metal oxide with a lithium metal hydride salt and reacting the treated transitional metal oxide with organic R group species.

9. An electrochemical cell, comprising:
    a first electrode, a second electrode and an electrolyte, wherein at least one of the first and second electrodes includes:
    a current collector;
    an active material associated with the current collector, wherein the active material comprises a transition metal oxide having a surface; and
    means for increasing compatibility of the surface of the active material with respect to an associated electrolyte, wherein the compatibility increasing means comprises a lithium salt of saccharin.

10. The electrochemical cell according to claim 9, wherein the lithium salt of saccharin is adsorbed onto the surface of the transition metal oxide.

11. A process for fabricating an electrode for use in an electrochemical cell, comprising the steps of:
    applying an active material onto a current collector, wherein the active material comprises a transition metal oxide having a surface, and wherein the surface is compatible with an associated electrolyte; and
    increasing the compatibility of the surface of the transition metal oxide with respect to an associated electrolyte by forming a chemical bond represented by —O—M(OR)n on said surface of the active material, wherein M is a metal atom, and wherein n is an integer ranging from 2 to 3.

12. The process according to claim 11, wherein the step of forming a chemical bond represented by —O—M(OR)n on said surface of the active material comprises the steps of:
    chemically bonding an inorganic lithium salt with the surface of the transition metal oxide; and associating an organic R group with the inorganic lithium salt.

13. The process according to claim 12, wherein the R group is selected from the group consisting of aliphatic or aromatic cyclic or acyclic hydrocarbons comprising an aliphatic or aromatic ether, thioether, ester or other heteroatom which is stable to reduction and/or oxidation and which promotes electrolyte/interface interactions.

14. The process according to claim 11 further comprising the step of:

associating the fabricated electrode with an electrolyte and another electrode so as to form an electrochemical cell.

15. A process for fabricating an electrode for use in an electrochemical cell, comprising the steps of:

applying an active material onto a current collector, wherein the active material comprises a transition metal oxide having a surface, and wherein the surface is compatible with an associated electrolyte; and increasing the compatibility of the surface of the transition metal oxide, by adsorbing a lithium salt of saccharin onto the surface of the transition metal oxide.

16. The process according to claim 15, wherein the step of adsorbing comprises the step of:

mixing the lithium salt of saccharin with a solvent;

associating the mixture with the surface of the transition metal oxide; and evaporating the solvent.

* * * * *